(12) United States Patent
Newstadt et al.

(10) Patent No.: US 10,581,781 B1
(45) Date of Patent: Mar. 3, 2020

(54) SYSTEMS AND METHODS FOR FACILITATING NEGOTIATION AND EXCHANGE OF INFORMATION BETWEEN PARTIES

(71) Applicant: Symantec Corporation, Mountain View, CA (US)

(72) Inventors: Keith Newstadt, Newton, MA (US); Ilya Sokolov, Boston, MA (US)

(73) Assignee: CA, Inc., San Jose, CA (US)

( * ) Notice: Subject to any disclaimer, the term of this patent is extended or adjusted under 35 U.S.C. 154(b) by 306 days.

(21) Appl. No.: 15/277,658

(22) Filed: Sep. 27, 2016

(51) Int. Cl.
*H04L 12/58* (2006.01)
*H04L 29/08* (2006.01)

(52) U.S. Cl.
CPC .............. *H04L 51/14* (2013.01); *H04L 51/32* (2013.01); *H04L 67/306* (2013.01)

(58) Field of Classification Search
CPC . G06F 8/60; G06F 8/65; G06F 9/5027; G06F 9/5033; G06F 9/5055; G06F 9/5077; G06F 11/3006; G06F 21/44; G06F 21/6209; G06F 21/6272; G06F 21/73; G06F 16/248; G06F 21/6254; G06F 16/24578; G06F 16/254; G06F 16/951; G06F 21/602; G06F 3/0482; G06F 16/23; G06F 16/24; G06F 16/24573; G06F 16/24575; G06F 16/285; G06F 16/29; G06F 16/335; G06F 16/9535; G06F 17/16; G06F 21/10; G06F 21/604; G06F 21/6218; G06F 21/6227; G06F 2221/2113; G06F 2221/2141; G06F 2221/2151; G06F 7/08; H04L 67/02; H04L 67/18; H04L 67/306; H04L 67/10; H04L 63/104; H04L 67/22; H04L 67/26; H04L 67/42; H04L 2209/38; H04L 2209/56; H04L 2209/805; H04L 2463/121
See application file for complete search history.

(56) References Cited

U.S. PATENT DOCUMENTS

2013/0182848 A1* 7/2013 Sundaram ............. H04L 9/0833 380/277
2015/0371015 A1* 12/2015 Garcia Manchado .. H04L 63/04 726/30

* cited by examiner

*Primary Examiner* — Djenane M Bayard
(74) *Attorney, Agent, or Firm* — FisherBroyles, LLP

(57) ABSTRACT

The disclosed computer-implemented method for facilitating negotiation and exchange of information between parties may include (i) receiving, at a backend computing system from an initiating computing device, an attribute of an initiating user of the initiating computing device and a designation of a specified attribute condition, (ii) receiving, at the backend computing system from a responding computing device, an attribute of a responding user of the responding computing device, (iii) determining, at the backend computing system, whether the attribute of the responding user satisfies the specified attribute condition, and (iv) based on the attribute of the responding user satisfying the specified attribute condition, sending, from the backend computing system, the attribute of the responding user to the initiating computing device and the attribute of the responding user to the initiating computing device. Various other methods, systems, and computer-readable media are also disclosed.

20 Claims, 6 Drawing Sheets

SYSTEMS AND METHODS FOR FACILITATING NEGOTIATION AND EXCHANGE OF INFORMATION BETWEEN PARTIES

BACKGROUND

Social networking tools are increasingly used by people as a primary form of communication with family and friends, as well as for contacting lesser-known acquaintances and strangers. While social networking websites and applications facilitate communication between people over a variety of platforms, users of such websites and applications often unknowingly expose a great deal personal information to others, including the public. While individuals may be aware of the risks of sharing personal information with others, they are often left with few choices for contacting people in a more secure manner using conventional social networking tools. For example, when an individual establishes a connection with another user via FACEBOOK, LINKEDIN, or a dating site, the individual may end up sharing a great deal of personal information with the other user via the the individual's online profile and user history.

Oversharing of personal information on social networking platforms may leave individuals vulnerable to attack both online and in the real world. For example, a malicious party may use personal information associated with a person's online profile information to determine the person's physical address, phone number, and/or email address in order to harass the person. Additionally, an individual's personal attributes may be used to set up fake online profiles that appear to belong to the individual and that are exploited for various purposes without the individual's consent or knowledge. In some instances, information associated with an individual's social networking profile and activities may be exploited to gain access to personal online accounts belonging to the individual. The instant disclosure, therefore, identifies and addresses a need for systems and methods for facilitating negotiation and exchange of information between parties.

SUMMARY

As will be described in greater detail below, the instant disclosure describes various systems and methods for facilitating negotiation and exchange of information between parties.

In one example, a computer-implemented method for facilitating negotiation and exchange of information between parties may include (i) receiving, at a backend computing system from an initiating computing device, an attribute of an initiating user of the initiating computing device and a designation of a specified attribute condition, (ii) receiving, at the backend computing system from a responding computing device, an attribute of a responding user of the responding computing device, (iii) determining, at the backend computing system, whether the attribute of the responding user satisfies the specified attribute condition, and (iv) based on the attribute of the responding user satisfying the specified attribute condition, sending, from the backend computing system, the attribute of the initiating user to the responding computing device, and sending, from the backend computing system, the attribute of the responding user to the initiating computing device. In one embodiment, the computer-implemented method may further include erasing, at the backend computing system, at least one of the attribute of the initiating user and the attribute of the responding user.

In some embodiments, the computer-implemented method may further include receiving, at the backend computing system from the initiating computing device, a request for the attribute of the responding user, and sending, from the backend computing system to the responding computing device, the request for the attribute of the responding user. In at least one embodiment, the computer-implemented method may also include receiving, at the backend computing system from the responding computing device, a request for an additional attribute of the initiating user and sending, from the backend computing system to the initiating computing device, the request for the additional attribute of the initiating user.

In some examples, sending the request for the attribute of the responding user to the responding computing device may include sending, from the backend computing system, the request for the attribute to a group of target computing devices that includes the responding computing device. The plurality of target computing devices may correspond to a predefined group. In some examples, the plurality of target computing devices may comprise computing devices within a specified region.

In some embodiments, the computer-implemented method may further include validating whether the attribute of the responding user is accurate. Validating whether the attribute of the responding user is accurate may include receiving verification from the responding user. In at least one example, validating whether the attribute of the responding user is accurate may include receiving verification from a validation service. The computer-implemented method may also include sending, from the backend computing system to the responding computing device, a prompt for the responding computing device to register with the validation service. In one example, the computer-implemented method may further include receiving, at the backend computing system from the initiating computing device, a specified level of assurance that the attribute of the responding user is accurate.

In one embodiment, the computer-implemented method may further include (i) receiving, at the backend computing system, a transaction ID from the initiating computing device, (ii) receiving, at the backend computing system, the transaction ID from the responding computing device, and (iii) determining, at the backend computing system, that the transaction ID received from the initiating computing device matches the transaction ID received from the responding computing device.

In some embodiments, the computer-implemented method may further include receiving, at the backend computing system from the responding computing device, at least one additional attribute of the responding user and, based on the attribute of the responding user satisfying the specified attribute condition, sending, from the backend computing system, the at least one additional attribute of the responding user to the initiating computing device.

In various embodiments, a system for implementing the above-described method may include (i) a communication module, stored in memory, that receives, at a backend computing system from an initiating computing device, an attribute of an initiating user of the initiating computing device and a designation of a specified attribute condition, and that receives, at the backend computing system from a responding computing device, an attribute of a responding user of the responding computing device, (ii) a determination module, stored in memory, that determines, at the backend computing system, whether the attribute of the responding user satisfies the specified attribute condition, (iii) a distribution module, stored in memory, that, based on the attribute of the responding user satisfying the specified attribute condition, sends, from the backend computing system, the attribute of the initiating user to the responding computing device, and sends, from the backend computing system, the attribute of the responding user to the initiating computing device, and (iv) at least one physical processor configured to execute the communication module, the determination module, and the distribution module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive, at a backend computing system from an initiating computing device, an attribute of an initiating user of the initiating computing device and a designation of a specified attribute condition, (ii) receive, at the backend computing system from a responding computing device, an attribute of a responding user of the responding computing device, (iii) determine, at the backend computing system, whether the attribute of the responding user satisfies the specified attribute condition, and (iv) based on the attribute of the responding user satisfying the specified attribute condition, send, from the backend computing system, the attribute of the initiating user to the responding computing device and send, from the backend computing system, the attribute of the responding user to the initiating computing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
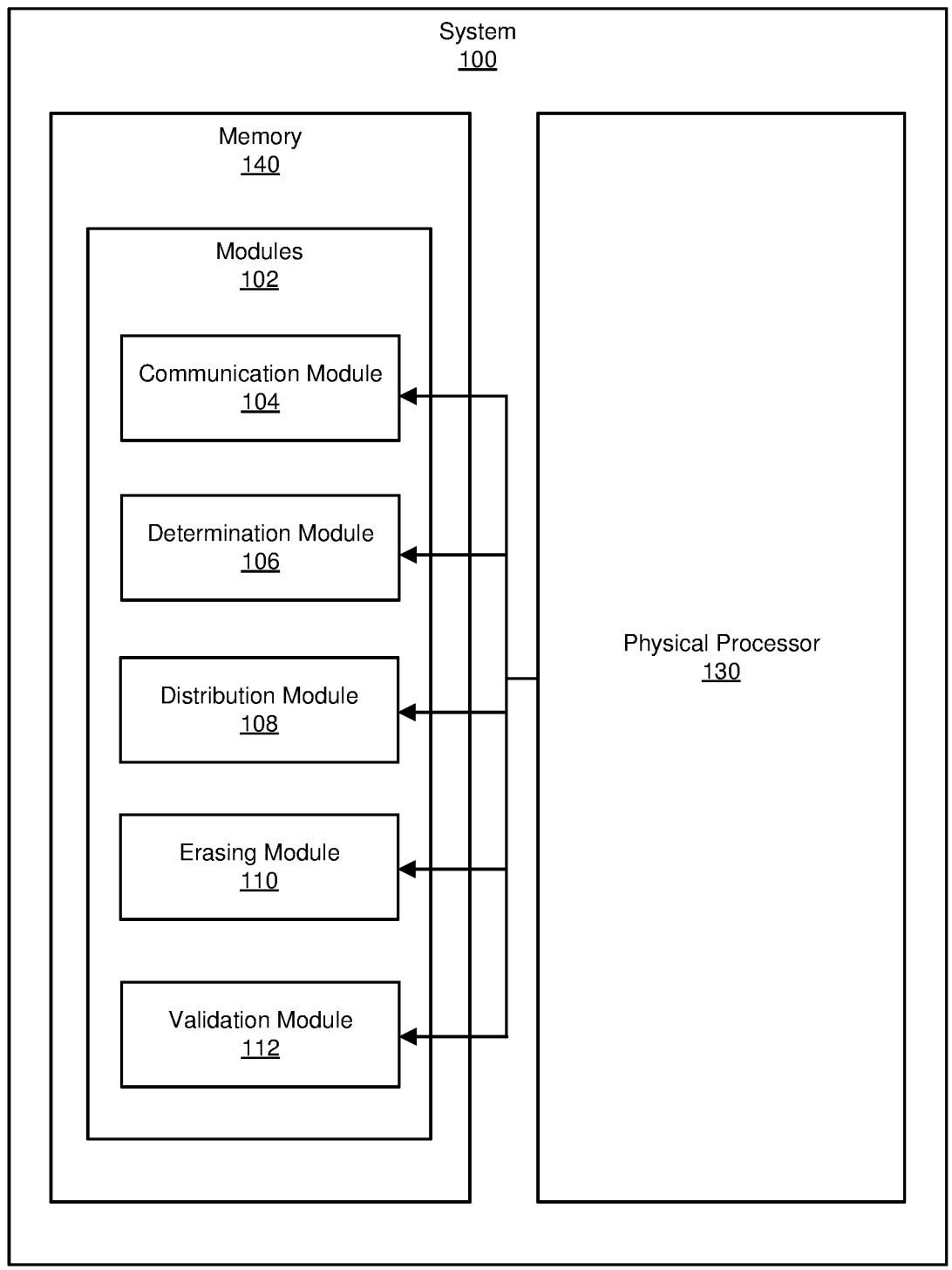
FIG. 1 is a block diagram of an example system for facilitating negotiation and exchange of information between parties.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for facilitating negotiation and exchange of information between parties. As will be explained in greater detail below, the disclosed systems and methods may facilitate the negotiation and exchange of information between individuals while preventing the exchange of more information than the individuals may be comfortable with. Additionally, the disclosed systems and methods may enable information that is offered for exchange between individuals to first be held by a separate third party, such as a backend computing system, pending a determination that the information satisfies specified conditions and/or validation criteria. Accordingly, users may control what data they share with others, thereby preventing personal data from unknowingly falling into the hands of unauthorized or malicious parties that might exploit the data.

Moreover, the third party service facilitating the exchange of data between the parties may not hold onto the data following the negotiation and/or exchange, thus eliminating opportunities for the exchanged data to be later exploited by a company holding the information or stolen during a data breach. The disclosed systems and methods may therefore facilitate secure and controlled sharing of information that enables users to negotiate what information is to be shared and what the conditions are for sharing such information. Additionally, the systems and methods described herein may enable a user to initiate a negotiation and exchange of information with another user without first having to share personal information with the other user prior to the exchange.

Figure 2:
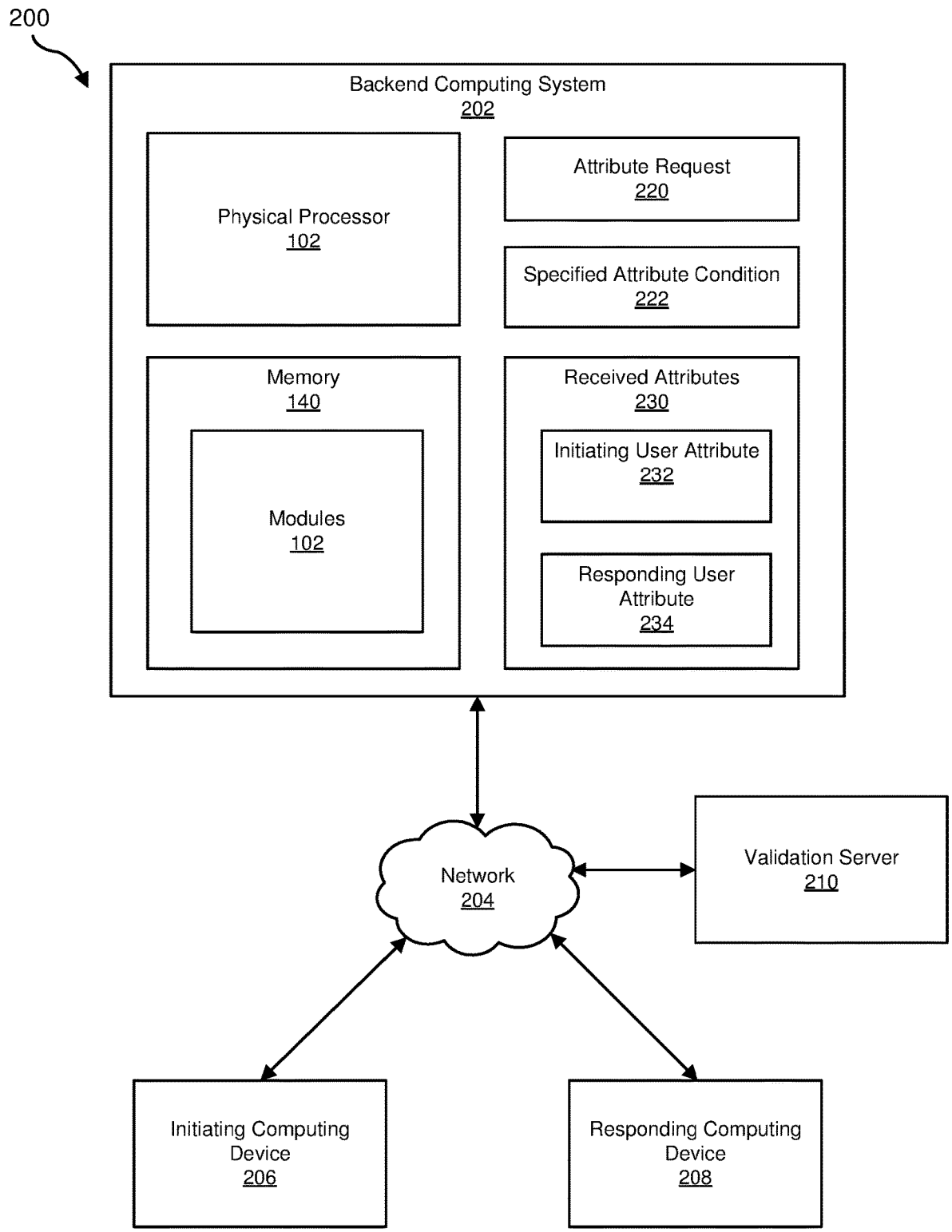
FIG. 2 is a block diagram of an additional example system for facilitating negotiation and exchange of information between parties.
Figure 3:
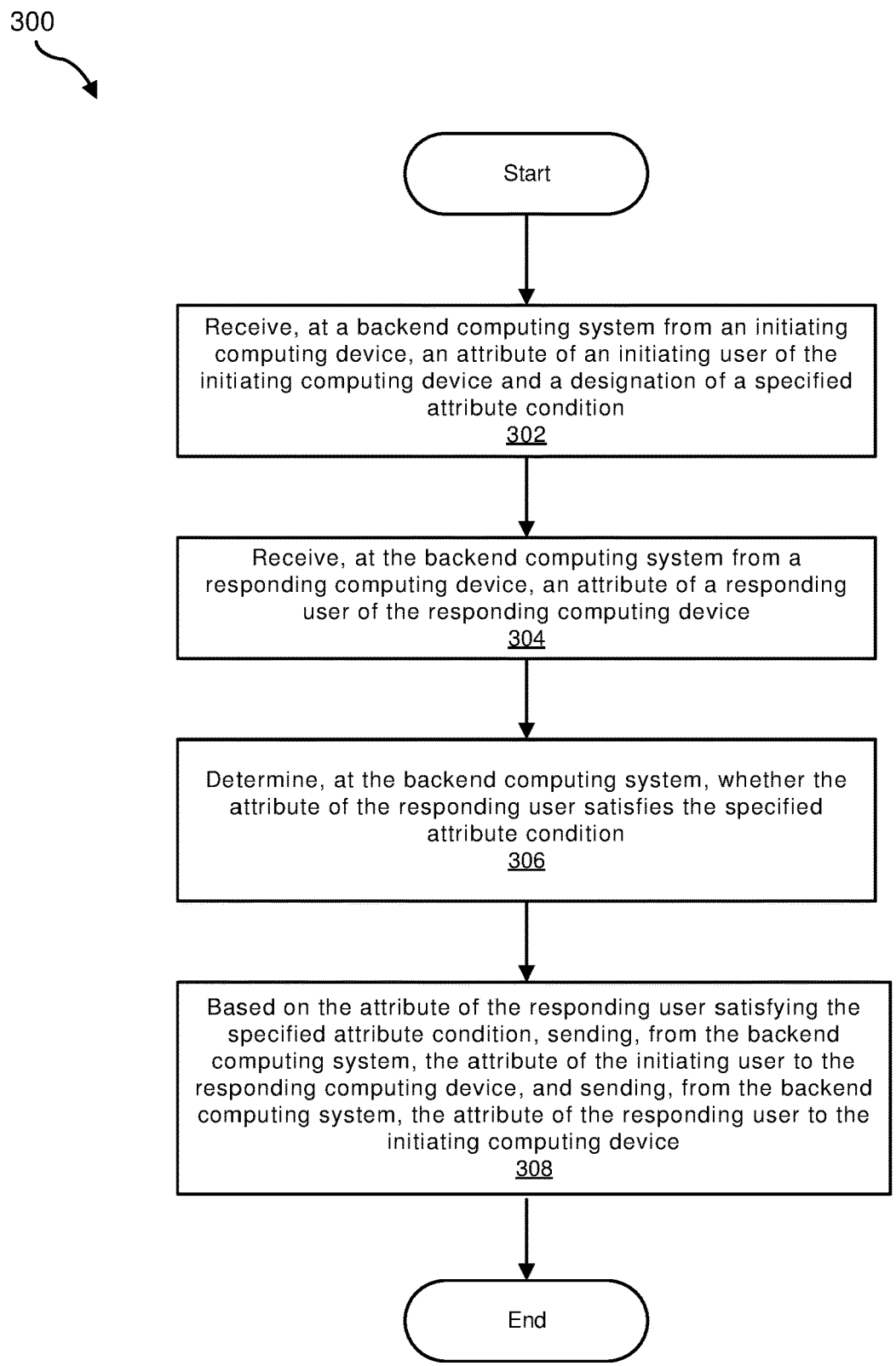
FIG. 3 is a flow diagram of an example method for facilitating negotiation and exchange of information between parties.
Figure 4:
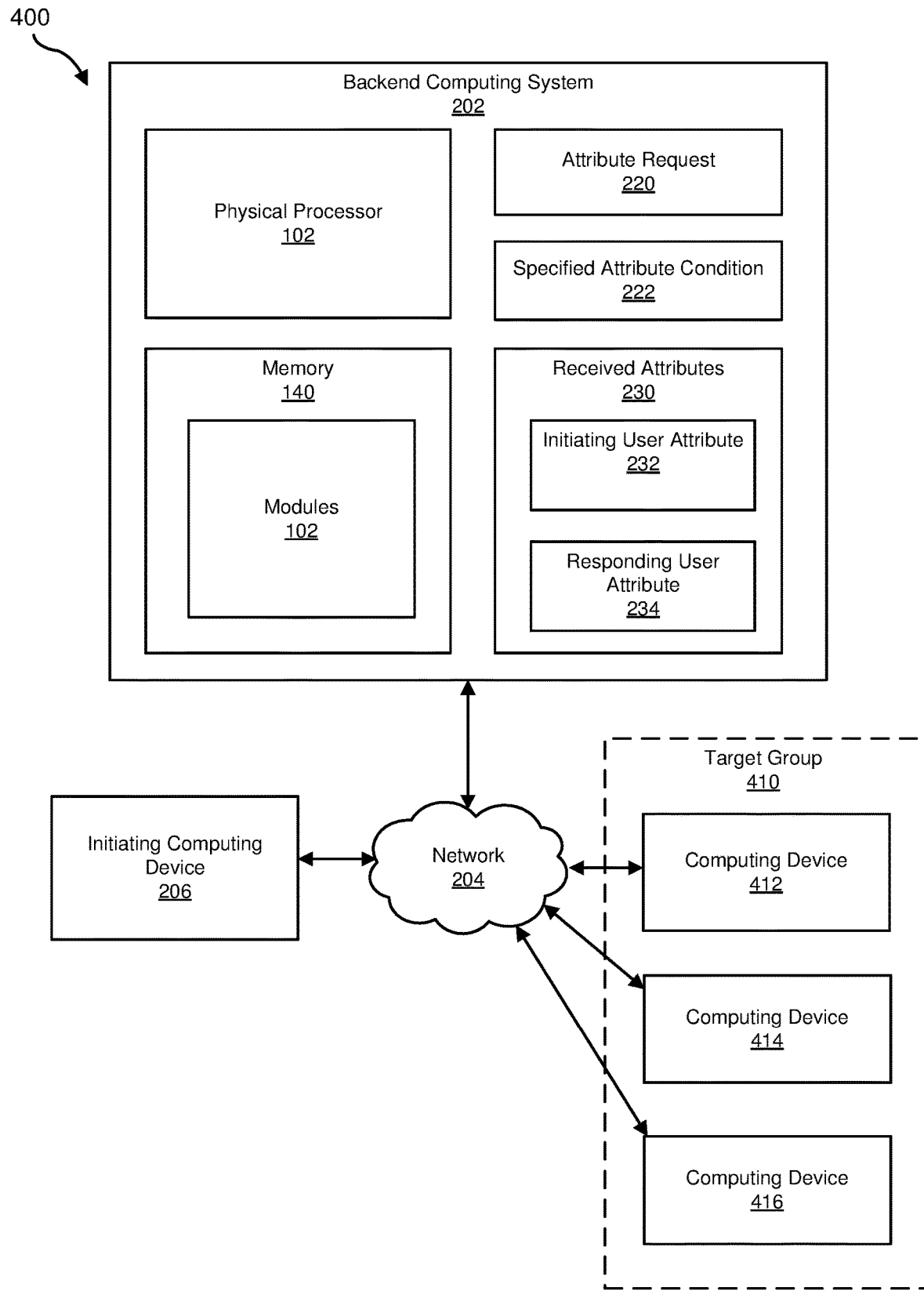
FIG. 4 is a block diagram of an additional example system for facilitating negotiation and exchange of information between parties.

The following will provide, with reference to FIGS. 1-2 and 4, detailed descriptions of example systems for facilitating negotiation and exchange of information between parties. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 5 and 6, respectively.

FIG. 1 is a block diagram of exemplary system 100 for facilitating negotiation and exchange of information between parties. As illustrated in this figure, exemplary system 100 may include one or more modules 102 for performing one or more tasks. For example, and as will be explained in greater detail below, exemplary system 100 may include a communication module 104 that (i) receives, at a backend computing system from an initiating computing device, an attribute of an initiating user of the initiating computing device and a designation of a specified attribute condition, and that (ii) receives, at the backend computing system from a responding computing device, an attribute of a responding user of the responding computing device. Exemplary system 100 may additionally include a determination module 106 that determines, at the backend computing system, whether the attribute of the responding user satisfies the specified attribute condition. Exemplary system 100 may also include a distribution module 108 that, based on the attribute of the responding user satisfying the specified attribute condition, sends, from the backend computing system, the attribute of the initiating user to the responding computing device, and sends, from the backend computing system, the attribute of the responding user to the initiating computing device. Additionally, exemplary system 100 may include an erasing module 110 that erases, at the backend computing system, at least one of the attribute of the initiating user and the attribute of the responding user. Exemplary system 100 may further include a validation module 112 that validates whether the attribute of the responding user and/or the attribute of the initiating user are accurate.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., backend computing system 202, initiating computing device 206, responding computing device 208, and/or validation server 210). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate negotiation and exchange of information between parties. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a backend computing system 202 in communication with an initiating computing device 206, a responding computing device 208, and a validation server 210 via a network 204. In one example, all or a portion of the functionality of modules 102 may be performed by backend computing system 202, initiating computing device 206, responding computing device 208, validation server 210, and/or any other suitable computing system. As will be described in greater detail below, one or more of modules 102 from FIG. 1 may, when executed by at least one processor of backend computing system 202, initiating computing device 206, responding computing device 208, and/or validation server 210, enable backend computing system 202, initiating computing device 206, responding computing device 208, and/or validation server 210 to facilitate negotiation and exchange of information between parties. For example, and as will be described in greater detail below, one or more of modules 102 may enable backend computing system 202 to facilitate negotiation and exchange of attributes and/or other information between initiating computing device 206 and responding computing device 208.

In at least one embodiment, and as will be described in greater detail below, communication module 104 may receive, at backend computing system 202, attributes (i.e., received attributes 230) from at least one of initiating computing device 206 and responding computing device 208. For example, communication module 104 may receive, from initiating computing device 206, an attribute of an initiating user (i.e., initiating user attribute 232) of initiating computing device 206. Additionally, communication module 104 may receive, from initiating computing device 206, a designation of a specified attribute condition 222. In one example, the designation of specified attribute condition 222 may be received in conjunction with an attribute request 220 from initiating computing device 206. Additionally, communication module 104 may receive, from responding computing device 208, an attribute of a responding user (i.e., responding user attribute 234) of responding computing device 208. For example, responding user attribute 234 may be received from responding computing device 208 in response to attribute request 220, which was sent to responding computing device 208.

In some embodiments, and as will be described in greater detail below, determination module 106 may determine, at backend computing system 202, whether responding user attribute 234 satisfies specified attribute condition 222. If responding user attribute 234 satisfies specified attribute condition 222, then distribution module 108 may facilitate the exchange of initiating user attribute 232 and responding user attribute 234 respectively between initiating computing device 206 and responding computing device 208. For example, distribution module 108 may send, from backend computing system 202, initiating user attribute 232 to responding computing device 208, and may send, from backend computing system 202, responding user attribute 234 to initiating computing device 206.

In certain embodiments, erasing module 110 may erase at least one of initiating user attribute 232 and responding user attribute 234 from backend computing system 202. In one embodiment, validation module 112 may validate whether responding user attribute 234 is accurate. For example, validation module 112 may receive a validation from responding computing device 208 and/or validation server 210 that responding user attribute 234 is accurate.

Backend computing system 202 generally represents any type or form of computing system capable of reading computer-executable instructions. Examples of backend computing system 202 include, without limitation, servers and/or computing devices that facilitate secure interactions and exchanges of information between client computing devices. Additional examples of backend computing system 202 include, without limitation, security servers, application servers, web servers, storage servers, and/or database servers configured to run certain software applications and/or provide various security, web, storage, and/or database services. Although illustrated as a single entity in FIG. 2, backend computing system 202 may include and/or represent a plurality of servers and/or computing devices that work and/or operate in conjunction with one another.

Network 204 generally represents any medium or architecture capable of facilitating communication or data transfer. In one example, network 204 may facilitate communication between backend computing system 202, initiating computing device 206, responding computing device 208, and/or validation server 210. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Initiating computing device 206 and responding computing device 208 each generally represent any type or form of computing device capable of reading computer-executable instructions. Examples of initiating computing device 206 and responding computing device 208 include, without limitation, laptops, tablets, desktops, servers, cellular phones (e.g., smartphones), Personal Digital Assistants (PDAs), multimedia players, embedded systems, wearable devices (e.g., smart watches, smart glasses, etc.), gaming consoles, variations or combinations of one or more of the same, exemplary computing system 510 in FIG. 5, and/or any other suitable computing device.

Validation server 210 generally represents any type or form of server capable of reading computer-executable instructions. Examples of validation server 210 include, without limitation, security, authentication, and/or information management servers that provide secure validation of various user attributes. Additional examples of backend computing system 202 include, without limitation, security servers, application servers, web servers, storage servers, and/or database servers configured to run certain software applications and/or provide various security, web, storage, and/or database services. Although illustrated as a single entity in FIG. 2, validation server 210 may include and/or represent a plurality of servers and/or computing devices that work and/or operate in conjunction with one another. In some examples, validation server 210 may be included in backend computing system 202.

FIG. 3 is a flow diagram of an example computer-implemented method 300 for facilitating negotiation and exchange of information between parties. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may receive, at a backend computing system from an initiating computing device, an attribute of an initiating user of the initiating computing device and a designation of a specified attribute condition.

For example, communication module 104 may, as part of backend computing system 202 in FIG. 2, receive, from initiating computing device 206, initiating user attribute 232, which is an attribute of an initiating user of initiating computing device 206. Additionally, communication module 104 may receive specified attribute condition 222 from initiating computing device 206.

Communication module 104 may receive initiating user attribute 232 and specified attribute condition 222 from initiating computing device 206 in a variety of contexts. For example, communication module 104 may receive initiating user attribute 232 from initiating computing device 206 when a user (i.e., an initiating user) of initiating computing device 206 wishes to offer to exchange attribute information with another user (i.e., a responding user) of responding computing device 208. In some embodiments, backend computing system 202 may store little or no attribute information for the initiating user of initiating computing device 206 prior to receiving initiating user attribute 232. In at least one example, as will be discussed in greater detail below, initiating user attribute 232 may only be stored at backend computing system 202 for purposes of an exchange with responding computing device 208, after which initiating user attribute 232 may be removed from backend computing system 202.

Initiating user attribute 232 may be any attribute, or plurality of attributes, of the initiating user that the initiating user wishes to share in exchange for information, such as attribute information of the responding user. The initiating user may specify, via initiating computing device 206, the information they wish to send as initiating user attribute 232 to backend computing system 202. The initiating user may also specify, via initiating computing device 206, the requirements for specified attribute condition 222. Specified attribute condition 222 may comprise any condition that the initiating user requires a responding user attribute (e.g., responding user attribute 234) to meet. For example, the initiating user may direct that responding user attribute 234 of a responding user of responding computing device 208 must meet specified attribute condition 222 prior to backend computing system 202 sharing initiating user attribute 232 with responding computing device 208. Specified attribute condition 222 may be any desired condition established by the initiating user prior to exchanging attribute information with responding computing device 208, without limitation.

In various embodiments, initiating computing device 206 may initiate a negotiation to exchange information with responding computing device 208 in a variety of contexts. In at least one embodiment, as will be discussed in greater detail below in relation to FIG. 4, initiating computing device 206 may target a plurality of computing devices for a potential exchange of information. In one example, initiating computing device 206 may initiate the negotiation directly with responding computing device 208. For example, initiating computing device 206 may communicate with responding computing device 208 via network 204 or via a direct connection, such a BLUETOOTH connection or a WiFi connection. In certain examples, the initiating user of initiating computing device 206 may initiate the negotiation directly with the responding user of responding computing device 208. For example, the initiating user may meet the responding user in person and the two users may desire to exchange additional information. However, before exchanging personal information, the initiating user and/or the responding user may wish to securely negotiate the exchange of attributes and/or validate attributes of each user prior to exchanging the information. Accordingly, the initiating user and the responding user may each submit one or more attributes (e.g., initiating user attribute 232 and responding user attribute 234) to backend computing system 202 respectively via initiating computing device 206 and responding computing device 208 according to the systems and methods discussed herein.

In some embodiments, initiating computing device 206 may initiate a negotiation to exchange information with responding computing device 208 via backend computing system 202. For example, initiating computing device 206 may send attribute request 220 to backend computing system 202. Communication module 104 may, as part of backend computing system 202 in FIG. 2, receive attribute request 220 from initiating computing device 206. Attribute request 220 may include a request for at least one attribute of the responding user, such as responding user attribute 234, from responding computing device 208. In at least one example, attribute request 220 may be received in conjunction with the receipt at least one attribute of the initiating user, such as initiating user attribute 232, from initiating computing device 206. In some examples, attribute request 220 may indicate that the initiating user has agreed to send initiating user attribute 232 to responding computing device 208 in exchange for receipt of and/or validation of responding user attribute 234 received by backend computing system 202 from responding computing device 208. Communication module 104 may then send attribute request 220 to responding computing device 208. The responding user may agree to an exchange of information with the initiating user by sending the at least one attribute, such as responding user attribute 234, to backend computing system 202.

At step 304, one or more of the systems described herein may receive, at the backend computing system from a responding computing device, an attribute of a responding user of the responding computing device. For example, communication module 104 may, as part of backend computing system 202 in FIG. 2, receive, from responding computing device 208, responding user attribute 234, which was requested by initiating computing device 206.

Communication module 104 may receive responding user attribute 234 from responding computing device 208 in a variety of contexts. For example, communication module 104 may receive responding user attribute 234 from responding computing device 208 when the responding user of responding computing device 208 wishes to agree to exchange attribute information with the initiating user of initiating computing device 206. The receipt of responding user attribute 234 by communication module may signal agreement to the exchange of attributes between the initiating user and the responding user. Responding user attribute 232 may be any attribute, or plurality of attributes, of the responding user requested by initiating computing device 206 either directly or via network 204 and/or backend computing system 202.

In some embodiments, backend computing system 202 may send, to responding computing device 208, an indication of what initiating user attribute 232 is (i.e., an attribute identifier) without disclosing initiating user attribute 232 (i.e., an attribute value) to responding computing device 208. For example, initiating computing device 206 may receive an indication that initiating user attribute 232 is a name or contact info (e.g., email address, phone number, physical address, etc.) for the initiating user, but initiating user attribute 232 may not be disclosed to initiating computing device 206. As discussed in greater detail below, the exchange may be further conditioned on validation of responding user attribute 234. In some embodiments, backend computing system may store little or no attribute information for the responding user of responding computing device 208 prior to receiving responding user attribute 234. In at least one example, as will be discussed in greater detail below, responding user attribute 234 may only be stored at backend computing system 202 for purposes of validation and/or exchange with initiating computing device 206, after which responding user attribute 234 may be removed from backend computing system 202.

In one embodiment, the responding user may wish to further negotiate with the initiating user prior to agreeing to exchange information with the initiating user. For example, the responding user may not agree to send the at least one attribute of the responding user identified in attribute request 220. In some examples, the responding user may agree to send the at least one attribute of the responding user identified in attribute request 220 only on condition that the initiating user provide at least one additional attribute of the initiating user (e.g., attributes in addition to initiating user attribute 232). In some examples, the responding user may send, to backend computing system 202, additional or alternative attributes of the responding user (e.g., attributes in addition to or in place of the requested responding user attribute 234) that are not identified in attribute request 220. The responding user may also send, to backend computing system 202 via responding computing device 208, a request for at least one additional attribute of the initiating user. Backend computing system 202 may receive, at communication module 104, the additional or alternative attributes of the responding user and/or the request for at least one additional attribute of the initiating user.

Communication module 104 may then send, to initiating computing device 206, the request for the at least one additional attribute of the initiating user and/or an indication that the responding user provided attributes of the responding user in addition to or in place of the requested responding user attribute 234. If the initiating user agrees to the modified exchange of attributes by sending the requested at least one additional attribute of the initiating user and/or by accepting the attributes of the responding user submitted by the responding user in addition to or in place of the requested responding user attribute 234, then backend computing system 202 may proceed with the exchange of information between the initiating user and the responding user, as will be discussed in greater detail below. Alternatively, the initiating user may not agree to the modified exchange of attributes and may either reject the exchange of attributes with the responding user and/or may further modify the exchange of attributes prior to agreeing to the exchange. The initiating user and the responding user may negotiate back and forth via backend computing system 202 and/or directly via initiating computing device 206 and responding computing device 208 until an agreement is reached. Once agreement is reached, the agreed upon attributes may be distributed by backend computing system 202 and/or the attributes may be validated as discussed in greater detail below.

In one embodiment, one or more of the systems described herein may (i) receive, at the backend computing system, a transaction ID from the initiating computing device, (ii) receive, at the backend computing system, the transaction ID from the responding computing device, and (iii) determine, at the backend computing system, that the transaction ID received from the initiating computing device matches the transaction ID received from the responding computing device. For example, communication module 104 may, as part of backend computing system 202 in FIG. 2, receive a transaction ID from initiating computing device 206. Communication module 104 may additionally receive the same transaction ID, or a related transaction ID, from responding computing device 208. Determination module 106 may, as part of backend computing system 202 in FIG. 2, then determine that the transaction ID received from initiating computing device 206 matches, or otherwise corresponds to, the transaction ID received from responding computing device 208.

In some embodiments, the initiating user and the responding user may determine that they wish exchange information with each other. For example, the initiating user and the responding user may meet in person or may communicate to a limited extent with each other via network 204. In order to facilitate the exchange of information, backend computing system 202 may generate a unique transaction ID for purposes of negotiating and exchanging information via backend computing system 202 according to the disclosed systems and methods. The transaction ID may enable the initiating user and the responding user to conduct the negotiation and/or exchange of information via backend computing system 202 by identifying themselves to backend computing system 202 as being parties to the same negotiation and/or exchange. For example, once backend computing system 202 receives the generated transaction ID from initiating computing device 206 and responding computing device 208, backend computing system 202 may recognize that initiating computing device 206 and responding computing device 208 are involved in a negotiation and exchange of information with one another according to the disclosed systems and methods. The transaction ID may also enable a greater level of security and anonymity between the initiating user and the responding user because they do not need to first exchange additional identifying information (e.g., an email address, IP address, MAC address, user name, etc.) in order to take part in the negotiated transaction via backend computing system 202.

At step 306, one or more of the systems described herein may determine, at the backend computing system, whether the attribute of the responding user satisfies the specified attribute condition. For example, determination module 106 may, as part of backend computing system 202 in FIG. 2, determine whether responding user attribute 234 satisfies specified attribute condition 222.

Determination module 106 may determine whether responding user attribute 234 satisfies specified attribute condition 222 in a variety of contexts. Specified attribute condition 222 may be any desired condition established by the initiating user prior to exchanging attribute information with responding computing device 208, without limitation. For example, specified attribute condition 222 may require that a job title attribute of the responding user must correspond to a required rank or position (e.g., director level or above) within an organization. In some examples, specified attribute condition 222 may require that the responding user be employed in a specified field, that the responding user hold a certain degree or education level, that the responding user have a specified skill set or experience level, that the responding user have a specified marital status (e.g., single, married, etc.), and/or any other condition established by the initiating user, without limitation.

In additional embodiments, specified attribute condition 222 may require that responding user attribute 234 corresponds to an attribute of the initiating user. For example, specified attribute condition 222 may require that the responding user attended a specified school (e.g., the same high school or college as the initiating user), that the responding user grew up in a specified locality (e.g., the same city as the initiating user), that the responding user currently or previously worked at a specified company (e.g., the same company that the initiating user worked at or a company that the initiating user is seeking employment at), and/or that the responding user knows one or more contacts (business associates, friends, family members, etc.) of the initiating user. In some embodiments, the responding user may also establish a specified attribute condition for at least one attribute (e.g. initiating user attribute 232) of the initiating user prior to agreeing to the exchange of information via backend computing system 202.

In some embodiments, specified attribute condition 222 may require that responding user attribute 234 is validated as being accurate prior to exchanging attribute information with responding computing device 208. For example, specified attribute condition 222 may require that responding user attribute 234 be validated, either by the responding user via responding computing device 208 or by a third party validation service, such as validation server 210. In some examples, specified attribute condition 222 may specify a required level of assurance for the validation of responding user attribute 234. For example, specified attribute condition 222 may require a lower level of assurance for responding user attribute 234, in which case responding user attribute 234 may simply be validated by the responding user providing identification (e.g., a name, picture, phone number, image of identification card, etc.) and/or an assurance that the provided information is accurate.

In some examples, specified attribute condition 222 may require a higher level of assurance for responding user attribute 234. To satiny the requirement for a higher level of assurance, responding user attribute 234 may be sent to validation server 210 from backend computing system 202 or directly from responding computing device 208. At validation server 210, responding user attribute 234 may be checked against known attribute data stored at validation server 210 or elsewhere. In some embodiments, validation server 210 may be a server managed by a trusted information management and validation authority (e.g., EXPERIAN, NORTON IDENTIFY, etc.). For example, validation server 210 may determine whether a name, telephone number, address, and/or other identifying information submitted as responding user attribute 234 is legitimate and/or corresponds to other information provided by the responding user. In at least one example, validation server 210 may search trusted public or private data sources for information to validate responding user attribute 234. For example, validation server 210 may search public profile information that is related to responding user attribute 234, such as information available through one or more integrated social networks (e.g., FACEBOOK, TWITTER, LINKEDIN, INSTAGRAM, etc.). For example, if responding user attribute 234 includes a name of the responding user, validation server 210 may search for information related to the responding user's name.

Once validation server 210 has validated responding user attribute 234, validation server 210 may send an indication of the validation to backend computing system 202, to initiating computing device 206, and/or to responding computing device 208. If information other than responding user attribute 234 was utilized by validation server 210 to validate the accuracy of responding user attribute 234, validation server 210 may not send such other information to backend computing system 202, enabling limited sharing of attribute information between the initiating user and the responding user.

In some embodiments, the validation may facilitated by the responding user and/or the initiating user being registered with a trusted validation authority (e.g., NORTON IDENTITY). For example, the responding user and/or the initiating user may have an account set up with the trusted validation authority, and validation server 210 may utilize information associated with responding user attribute 234 to validate responding user attribute 234. In some examples, responding user attribute 234 may be an identifier, such as an electronic identification card ("eID"), that identifies the responding user. In some cases, the identifier may also allow for the validation of other user attributes of the responding user without requiring the responding user to submit the other user attributes to backend computing system 202.

In one embodiment, one or more of the systems described herein may send, from the backend computing system to the responding computing device, a prompt for the responding computing device to register with the validation service. For example, if the responding user is not registered with a trusted validation authority, communication module 104 may send a prompt for the responding user to first register with the trusted validation authority prior to proceeding with the negotiation and/or exchange of information between the initiating user and the responding user.

In some examples if determination module 108 determines that responding user attribute 234 does not satisfy specified attribute condition 222 and/or is not otherwise validated by validation module 210, then the exchange of information between initiating computing device 206 and responding computing device 208 may not be carried out by backend computing system 202. In some embodiments, the initiating user and the responding user may have an opportunity to further negotiate for the exchange of information based on other terms, such as the submission of additional attributes, modification of specified attribute condition 222, and/or further validation from other parties and/or trusted authorities. In at least one embodiment, the negotiation may end and the exchange of information between the initiating user and the responding user may not occur.

At step 308, one or more of the systems described herein may, based on the attribute of the responding user satisfying the specified attribute condition, send, from the backend computing system, the attribute of the initiating user to the responding computing device, and may send, from the backend computing system, the attribute of the responding user to the initiating computing device. For example, distribution module 106 may, as part of backend computing system 202 in FIG. 2, and based on the determination that responding user attribute 234 satisfies specified attribute condition 222, send initiating user attribute 232 to responding computing device 208, and may send responding user attribute 234 to initiating computing device 206.

Distribution module 106 may send initiating user attribute 232 to responding computing device 208 and may send responding user attribute 234 to initiating computing device 206 in a variety of contexts. For example, initiating user attribute 232 and responding user attribute 234 may be respectively sent to responding computing device 208 and initiating computing device 206 once specified attribute condition 222 is determined to be satisfied by responding user attribute 234. In some examples, the respective user attributes may be sent to responding computing device 208 and initiating computing device 206 only after responding user attribute 234 is validated. In at least one example, the respective user attributes may be sent to responding computing device 208 and initiating computing device 206 only after initiating user attribute 232 has been determined to meet an attribute condition specified by the responding user and/or after initiating user attribute 232 has been validated.

In some embodiments, one or more of the systems described herein may receive at least one additional attribute of the initiating user and/or the responding user in addition to initiating user attribute 232 and/or responding user attribute 234. In one example, distribution module 108 may, based on the determination that responding user attribute 234 satisfies specified attribute condition 222, send the at least one additional attribute of the responding user to initiating computing device 206 and/or may send the at least one additional attribute of the initiating user to responding computing device 208.

In some embodiments, one or more of the systems described herein may erase, at the backend computing system, at least one of the attribute of the initiating user and the attribute of the responding user. For example, erasing module 110 may, as part of client computing device 202 in FIG. 2, erase at least one of initiating user attribute 232 and responding user attribute 234.

Erasing module 110 may erase at least one of initiating user attribute 232 and responding user attribute 234 in a variety of contexts. For example, after initiating user attribute 232 and responding user attribute 234 are respectively sent to responding computing device 208 and initiating computing device 206, erasing module 110 may erase initiating user attribute 232 and responding user attribute 234 from backend computing system 202. In some examples, erasing module 110 may also erase initiating user attribute 232 and responding user attribute 234 if the exchange of attributes between initiating computing device 206 and responding computing device 208 does not occur due to, for example, responding user attribute 234 not satisfying specified attribute condition 222 and/or initiating user attribute 232 not satisfying an attribute condition specified by the responding user. Therefore, backend computing system 202 may not store potentially sensitive user information, such as initiating user attribute 232 and responding user attribute 234, long-term. Rather, initiating user attribute 232 and responding user attribute 234 may simply be utilized by backend computing system 202 for the limited purpose of negotiating and exchanging information between initiating computing device 206 and responding computing device 208.

FIG. 4 is a block diagram of an exemplary computing system 400 for facilitating negotiation and exchange of information between parties. In some examples, the initiating user may send a request for a user attribute (e.g., responding user attribute 234) to a plurality of computing devices. For example, as shown in FIG. 4, computing system 400 may include a plurality of computing devices, such as computing device 412, computing device 414, and computing device 416. Initiating computing device 206 may send a request (e.g., attribute request 220) to each of computing device 412, computing device 414, and computing device 416 either directly and/or via backend computing system 202 according to the disclosed systems and methods. Communication module 104 of backend computing system may receive user attributes (e.g., responding user attribute 234) from one or more of computing device 412, computing device 414, and computing device 416.

Determination module 106 may determine whether the user attributes received from computing device 412, computing device 414, and/or computing device 416 satisfy specified attribute condition 222 according to any of the disclosed systems and methods. In some examples, validation module 112 may also validate the user attributes received from computing device 412, computing device 414, and/or computing device 416 according to any of the disclosed systems and methods. Initiating computing device 206 may then exchange information, such as user attributes, with at least one of computing device 412, computing device 414, and computing device 416 based on a determination that the respective user attributes of computing device 412, computing device 414, and/or computing device 416 satisfy specified attribute condition 222 and/or upon validation of the respective user attributes.

In one embodiment, computing device 412, computing device 414, and computing device 416 may correspond to a predefined group. For example computing device 412, computing device 414, and computing device 416 may belong to a target group 410 that is defined based on any suitable parameters defined by the initiating user. For example, target group 410 may include computing device 412, computing device 414, and computing device 416, which are all located within a specified region and/or within a specified proximity to initiating computing device 206. In additional embodiments, target group 410 may comprise computing devices associated with users who are members of an identified target group (e.g., an organization, a school alumni organization, a trade association, a club, a dating service, etc.), without limitation.

As explained above in connection with example method 300 in FIG. 3, the disclosed technology may facilitate the negotiation and exchange of information between parties while preventing the exchange of more information than the parties to the exchange may be comfortable with. Additionally, the technology may enable information that is offered for exchange between the parties to first be held by a third party, such as a backend computing system, that is separate from the negotiating parties, pending a determination that the information satisfies specified conditions and/or validation criteria. Accordingly, users may control what data they share with others, thereby preventing personal data from unknowingly falling into the hands of unauthorized or malicious parties that might exploit the data.

Moreover, the third party service facilitating the exchange of data between the parties may not hold onto the data following the negotiation and/or exchange, thus eliminating opportunities for the exchanged data to be later exploited by a company holding the information or stolen during a data breach. The disclosed technology may therefore facilitate secure and controlled sharing of information that enables parties to negotiate what information is to be shared and what the conditions are for sharing such information. Additionally, the systems and methods described herein may enable a party to initiate an exchange of information with another party without first having to share personal information with the other party prior to the other party agreeing to the exchange and specified conditions.

In at least one embodiment, the systems and methods described herein may use a peer-to-peer protocol to negotiate what attributes parties to the negotiation require to receive in exchange for specific attributes they are willing to share. A trusted third party (e.g., a backend computing system) may hold, and optionally validate, the attributes received from the parties to the negotiation until all conditions specified by the parties are met. The third party may then deliver the agreed upon attributes back to the users. For example, when two users meet, an initiating user may initiate an attribute exchange via the initiating user's computing device (e.g., a mobile device). The initiating user may offer certain information to share in exchange for specified information that they request to receive in exchange. The responding user may receive the request on their computing device (e.g., a mobile device) and may automatically or conditionally agree to the exchange by, for example, submitting the specified information requested by the initiating user. In some examples, the initiating user may prompt the responding user to accept the exchange or renegotiate based on additional or alternative conditions. This process may repeat until both users agree to the presented conditions.

In some embodiments, the users may agree to exchange one or more attributes, such as user attributes. The request for the specified attributes may include an attribute identifier (e.g., job title, name, phone number, etc.) for each requested attribute and a level of assurance that each requested attribute value will be true. For example, a lower level of assurance may merely require that a user asserts that the attribute value is true, and the user may provides their own identification as the signer of the information. Conversely, a higher level of assurance may be obtained from a third party attribute validator (e.g., EXPERIAN, NORTON IDENTITY, etc.). If an attribute is being requested, then the request might might also include the expected value for the attribute and the level of assurance that the attribute value is true. For example, the initiating user may indicate that they will provide their resume in exchange for the employer name and job title attributes of the responding user, validated by a trusted authority, along with a condition that the job title of the responding user is director or above.

In some embodiments, the negotiation process may take place online, and may even be automated. For example, an initiating user may post their resume attributes online. However, rather than broadcasting the resume attributes without restriction, the initiating user may configure exchange conditions that more closely mirror expectations that the initiating user might have in a face-to-face meeting and/or negotiation.

In at least one embodiment, once the initiating user and the responding user agree to the exchange, a transaction ID may be generated and each of the users may upload their attributes to a third party (e.g., NORTON IDENTITY). The third party may then validate the received attributes. If the user attributes are signed by a trusted third party, then the validation can be almost instantaneous. In some examples, the attributes may be quickly validated through a separate trusted party via an application programming interface ("API"). For example, the initiating user may require that the responding user knows at least one of the initiating user's closest friends or immediate family before sharing an attribute, such as a phone number, which could then be validated via a number of integrated social networks (e.g., FACEBOOK, LINKEDIN, TWITTER, etc.).

In one embodiment, the disclosed systems and methods could also support a longer process where some attributes may be validated before all attributes are released to the users. For example, if an attribute of the responding user, such as an employer attribute, is not signed by a trusted third party, the responding user may receive an email directing the responding user to create an account with a trusted validation service (e.g., NORTON IDENTITY). The responding user may be directed to complete ID verification with the validation service and have the requested attributes signed by the validation service before the exchange can take place. Once validation has completed, the attributes may be respectively delivered to the initiating user device and the responding user device.

Figure 5:
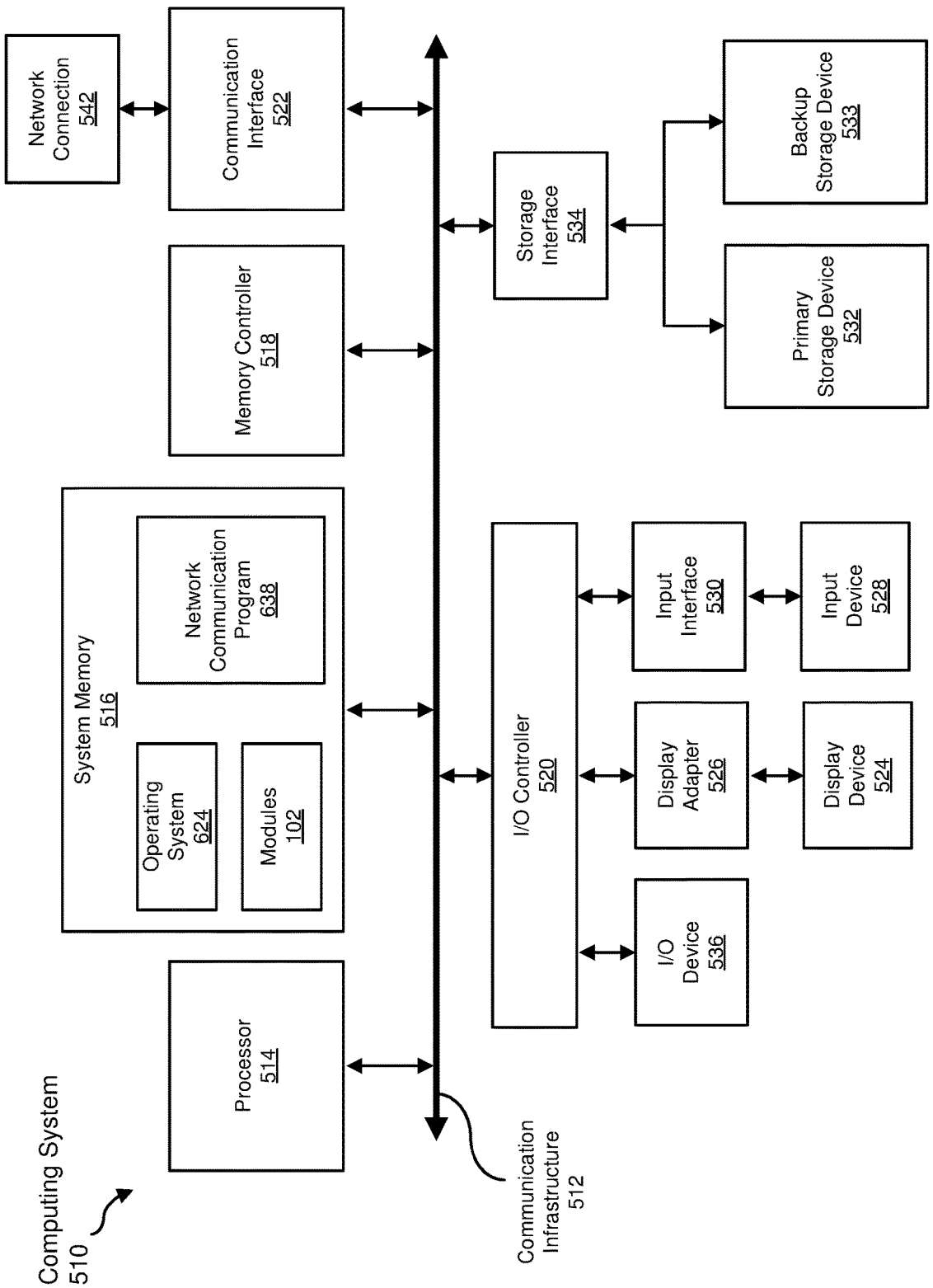
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
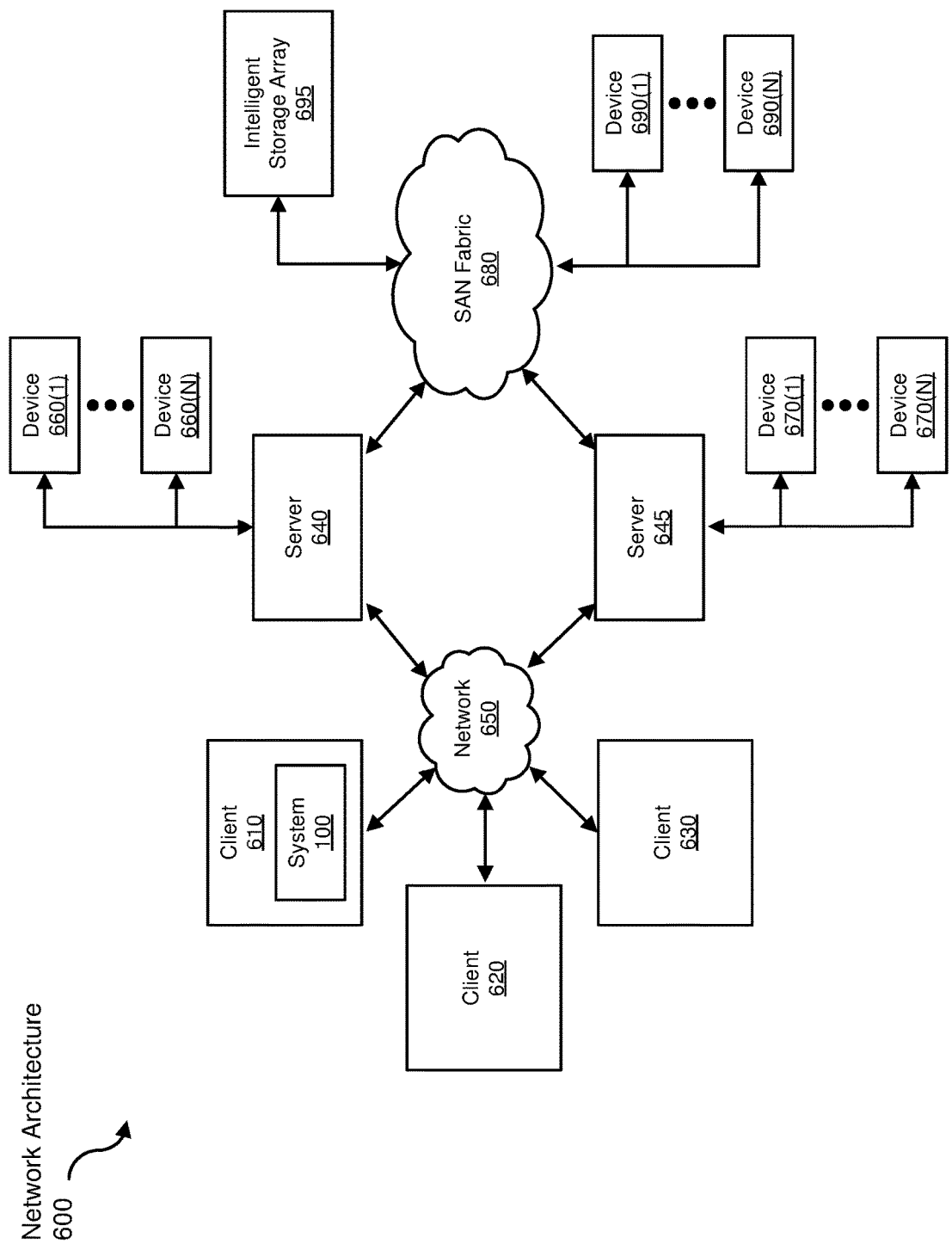
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for facilitating negotiation and exchange of information between parties.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive user attribute data to be transformed, transform the user attribute data by determining additional user attribute data associated with the received user attribute data and using the additional user attribute data to validate the received user attribute data, and use the result of the transformation to facilitate the negotiation and exchange of information between parties. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for facilitating negotiation and exchange of information between parties, at least a portion of the method being performed by a backend computing system comprising at least one processor, the method comprising:
    receiving, at the backend computing system from an initiating user via an initiating computing device:
        an attribute of the initiating user of the initiating computing device, the attribute of the initiating user specified by the initiating user; and
        a designation of a user-specified attribute condition;
    receiving, at the backend computing system from a responding user via a responding computing device, an attribute of the responding user of the responding computing device, the attribute of the responding user specified by the responding user;
    determining, at the backend computing system, whether the attribute of the responding user satisfies the user-specified attribute condition; and
    based on the attribute of the responding user satisfying the user-specified attribute condition:
        sending, from the backend computing system, the attribute of the initiating user to the responding computing device, and
        sending, from the backend computing system, the attribute of the responding user to the initiating computing device.

2. The method of claim 1, further comprising erasing, at the backend computing system, at least one of the attribute of the initiating user and the attribute of the responding user.

3. The method of claim 1, further comprising:
    receiving, at the backend computing system from the initiating computing device, a request for the attribute of the responding user; and
    sending, from the backend computing system to the responding computing device, the request for the attribute of the responding user.

4. The method of claim 3, further comprising:
receiving, at the backend computing system from the responding computing device, a request for an additional attribute of the initiating user; and
sending, from the backend computing system to the initiating computing device, the request for the additional attribute of the initiating user.

5. The method of claim 3, wherein sending the request for the attribute of the responding user to the responding computing device comprises sending, from the backend computing system, the request for the attribute to a plurality of target computing devices that includes the responding computing device.

6. The method of claim 5, wherein the plurality of target computing devices corresponds to a predefined group.

7. The method of claim 5, wherein the plurality of target computing devices comprises computing devices within a specified region.

8. The method of claim 1, further comprising validating whether the attribute of the responding user is accurate.

9. The method of claim 8, wherein validating whether the attribute of the responding user is accurate comprises receiving verification from the responding user.

10. The method of claim 8, wherein validating whether the attribute of the responding user is accurate comprises receiving verification from a validation service.

11. The method of claim 10, further comprising sending, from the backend computing system to the responding computing device, a prompt for the responding computing device to register with the validation service.

12. The method of claim 8, further comprising receiving, at the backend computing system from the initiating computing device, a specified level of assurance that the attribute of the responding user is accurate.

13. The method of claim 1, further comprising:
receiving, at the backend computing system, a transaction ID from the initiating computing device;
receiving, at the backend computing system, a transaction ID from the responding computing device; and
determining, at the backend computing system, that the transaction ID received from the initiating computing device matches the transaction ID received from the responding computing device.

14. The method of claim 1, further comprising:
receiving, at the backend computing system from the responding computing device, at least one additional attribute of the responding user; and
based on the attribute of the responding user satisfying the user-specified attribute condition, sending, from the backend computing system, the at least one additional attribute of the responding user to the initiating computing device.

15. A system for facilitating negotiation and exchange of information between parties, the system comprising:
a memory;
a physical processor communicatively coupled to the memory;
a communication module, stored in the memory, that:
receives, at a backend computing system from an initiating user via an initiating computing device:
an attribute of the initiating user of the initiating computing device, the attribute of the initiating user specified by the initiating user; and
a designation of a user-specified attribute condition; and
receives, at the backend computing system from a responding user via a responding computing device, an attribute of the responding user of the responding computing device, the attribute of the responding user specified by the responding user;
a determination module, stored in the memory, that determines, at the backend computing system, whether the attribute of the responding user satisfies the user-specified attribute condition;
a distribution module, stored in the memory, that, based on the attribute of the responding user satisfying the user-specified attribute condition:
sends, from the backend computing system, the attribute of the initiating user to the responding computing device, and
sends, from the backend computing system, the attribute of the responding user to the initiating computing device; and
wherein the physical processor is configured to execute the communication module, the determination module, and the distribution module.

16. The system of claim 15, wherein:
the system further comprises an erasing module, stored in the memory, that erases, at the backend computing system, at least one of the attribute of the initiating user and the attribute of the responding user; and
the physical processor is further configured to execute the erasing module.

17. The system of claim 15, wherein the communication module:
receives, at the backend computing system from the initiating computing device, a request for the attribute of the responding user; and
sends, from the backend computing system to the responding computing device, the request for the attribute of the responding user.

18. The system of claim 15, wherein:
the system further comprises a validation module, stored in the memory, that validates whether the attribute of the responding user is accurate; and
the physical processor is further configured to execute the validation module.

19. The system of claim 15, wherein:
the communication module:
receives, at the backend computing system, a transaction ID from the initiating computing device; and
receives, at the backend computing system, a transaction ID from the responding computing device; and
the determination module determines, at the backend computing system, that the transaction ID received from the initiating computing device matches the transaction ID received from the responding computing device.

20. A non-transitory computer-readable medium comprising one or more computer-readable instructions that, when executed by at least one processor of a backend computing system, cause the backend computing system to:
receive, from an initiating computing device:
an attribute of an initiating user of the initiating computing device, the attribute of the initiating user specified by the initiating user; and
a designation of a user-specified attribute condition;
receive, from a responding computing device, an attribute of a responding user of the responding computing device, the attribute of the responding user specified by the responding user;
determine whether the attribute of the responding user satisfies the user-specified attribute condition; and based on the attribute of the responding user satisfying the user-specified attribute condition:
send the attribute of the initiating user to the responding computing device; and
send the attribute of the responding user to the initiating computing device.

* * * * *